(12) United States Patent
Breyer et al.

(10) Patent No.: US 8,702,178 B2
(45) Date of Patent: Apr. 22, 2014

(54) TROLLEY WHEEL TECHNOLOGY

(75) Inventors: Scott T. Breyer, Dousman, WI (US); Kyle C. Stoehr, Waukesha, WI (US)

(73) Assignee: Oconomowoc Mfg. Corp., Oconomowoc, WI (US)

( * ) Notice: Subject to any disclaimer, the term of this patent is extended or adjusted under 35 U.S.C. 154(b) by 373 days.

(21) Appl. No.: 12/646,610

(22) Filed: Dec. 23, 2009

(65) Prior Publication Data

US 2011/0147332 A1    Jun. 23, 2011

(51) Int. Cl.
*B60B 3/00* (2006.01)
*F16C 41/00* (2006.01)

(52) U.S. Cl.
USPC ......... 301/5.7; 301/5.309; 474/174; 452/177; 198/495; 384/622; 384/624; 384/42

(58) Field of Classification Search
USPC ............. 301/5.301, 5.7, 5.309; 474/166, 174, 474/188, 198–199; 452/177; 198/493–495, 198/781.04, 781.08, 835; 105/154; 384/622–624, 23, 42, 492
See application file for complete search history.

(56) References Cited

U.S. PATENT DOCUMENTS

| | | | |
|---|---|---|---|
| 1,429,118 A | 9/1922 | Townsend | |
| 1,617,085 A | 8/1926 | Specht | |
| 2,076,239 A | 9/1934 | Lemmon | |
| 3,588,206 A | 6/1971 | Frost | |
| 3,971,601 A | 7/1976 | Sytsma | |
| 4,019,789 A | 4/1977 | Rosin | |
| 4,109,343 A | 8/1978 | Weis et al. | |
| 4,219,240 A | 8/1980 | Brandenstein | |
| 4,367,905 A | 1/1983 | Nauta | |
| 4,484,525 A | 11/1984 | Forshee et al. | |
| 4,490,128 A | 12/1984 | Weiss et al. | |
| 4,534,749 A | 8/1985 | Hans | |
| 4,693,698 A * | 9/1987 | Olson, II | 464/111 |
| 4,993,538 A | 2/1991 | Norbury | |
| 5,066,145 A | 11/1991 | Sibley et al. | |
| 5,277,126 A | 1/1994 | Wendt et al. | |
| 5,357,868 A | 10/1994 | Maas | |
| 5,366,406 A | 11/1994 | Hobbel et al. | |

(Continued)

FOREIGN PATENT DOCUMENTS

| | | |
|---|---|---|
| DE | 0904755 | 2/1954 |
| DE | 2232752 | 9/1973 |
| FR | 2526909 | 11/1983 |
| GB | 1418716 | 12/1975 |

OTHER PUBLICATIONS

Photographs of Frost Sani-Trolley wheels; 4 pages; believed to have been in commercial use prior to Dec. 23, 2008.

(Continued)

*Primary Examiner* — Jason Bellinger
(74) *Attorney, Agent, or Firm* — Fredrikson & Byron, PA

(57) ABSTRACT

The invention provides a trolley wheel assembly for a conveyor system, e.g., an overhead conveyor system. In certain embodiments, the wheel assembly includes at least one wheel face having a contour (optionally a funneling configuration and/or one or more surface features) configured to facilitate flow of a fluid toward an open bearing assembly of the wheel assembly. In some embodiments, the wheel assembly includes an inner race, outer race, and bearings having a particular hardness arrangement, optionally together with a polymer wheel having certain filler features. Methods for cleaning such a trolley wheel assembly are also provided.

48 Claims, 10 Drawing Sheets

(56) References Cited

U.S. PATENT DOCUMENTS

| | | | |
|---|---|---|---|
| 5,566,623 | A | 10/1996 | Wareham |
| 6,179,701 | B1 | 1/2001 | Tieleman |
| 6,854,893 | B2 | 2/2005 | Schmidt |
| 6,915,745 | B2 | 7/2005 | Carder |
| 7,041,020 | B2 | 5/2006 | Singer |
| 7,435,005 | B2 | 10/2008 | Schmidl et al. |
| 7,448,807 | B2 | 11/2008 | Schenk et al. |
| 2004/0140160 | A1 | 7/2004 | Carder |

OTHER PUBLICATIONS

Photographs of Mammoth trolley wheels; 4 pages; believed to have been in commercial use prior to Dec. 23, 2008.

Photograph of Stork trolley wheels; 1 page; believed to have been in commercial use prior to Dec. 23, 2008.

Photograph of Meyn trolley wheel; 1 page; believed to have been in commercial use prior to Dec. 23, 2008.

Photograph of Linco trolley wheels; 1 page; believed to have been in commercial use prior to Dec. 23, 2008.

Photograph of Dapec trolley wheels; 1 page; believed to have been in commercial use prior to Dec. 23, 2008.

Decker, Eric, "Ball Bearings," Oct. 16, 2009, www.biztimes.com/news/2009110/16/ball-bearings, 3 pages.

International Search Report and Written Opinion, dated May 26, 2011 for PCT Application No. PCT/US2010/061969 (18 pages).

* cited by examiner

TROLLEY WHEEL TECHNOLOGY

BACKGROUND

Overhead trolley conveyor systems are used in a variety of settings in manufacturing and fabricating plants (automotive assembly lines, paint finishing lines, etc.), as well as in food processing plants. A typical conveyor system includes a track, a number of trolley assemblies riding on the track, and a drive mechanism that moves the trolleys along the track. A basic trolley assembly includes one or more trolley wheel assemblies that ride on the track and some form of bracket capable of suspending an item from the track. Different trolley wheel assemblies are used depending upon the particular setting and performance requirements, but in general a trolley wheel assembly includes a wheel with some form of bearing assembly.

During use, the trolley assemblies are subjected to a variety of environments in which the wheel assemblies can get dirty over a period of time. Trolley performance can degrade as the bearing assemblies become dirty. In many cases, debris and other contaminants within a bearing assembly can reduce the operational quality or life of the bearing assembly. Some trolley assemblies have closed, sealed, or shielded bearing assemblies that seek to prevent debris from entering the bearing assembly and degrading the bearing operation. Such bearing assemblies, however, can be difficult to maintain, difficult to relubricate, and/or they may not operate as effectively as open bearings. Moreover, when debris does enter such a bearing assembly, the debris can be extremely difficult to remove. When open bearing assemblies are used, periodic cleaning (e.g., through manual or automatic washing, such as spraying with water containing a cleaning or sterilizing agent) may be required.

SUMMARY OF THE INVENTION

In certain embodiments, the invention provides a trolley wheel assembly for use in a conveyor system. In the present embodiments, the trolley wheel assembly comprises a wheel having a central opening through which an axis of the wheel passes, a hub positioned within the central opening, the hub optionally having a threaded shaft (or another fastener, such as a rivet stake or the like) for coupling the hub to a trolley bracket assembly forming part of the conveyor system, and an open bearing assembly positioned within the central opening between the wheel and the hub. The bearing assembly provides relative rotational movement between the wheel and the hub. The wheel comprises a first face, a second face, and a circumferential rolling surface. In the present embodiments, the first and the second faces have inner boundaries (e.g., inner edges or inner edge regions) adjacent to the central opening, and at least one of the faces has one or more surface features configured to facilitate (e.g., direct) flow of a fluid toward the open bearing assembly when cleaning the open bearing assembly.

Some embodiments of the invention provide a trolley wheel assembly for use in a conveyor system. In the present embodiments, the trolley wheel assembly comprises a wheel having a central opening, an outer race positioned within the central opening, an inner race positioned within the outer race, a plurality of bearing members positioned in a single row between the inner race and the outer race (the bearing members providing relative rotational movement between the inner race and the outer race; the inner race and the outer race providing a raceway containing the bearing members such that the bearing members and the raceway are accessible from an environment surrounding the trolley wheel assembly), a hub coupled to the inner race, and directing means for directing a fluid into the raceway for cleaning the raceway and the bearing members. In some of the present embodiments, the wheel is coupled to (e.g., joined to, so as to rotate together with) the outer race, the hub is joined to (e.g., so as to rotate together with) the inner race, and the hub has a shaft (optionally a threaded shaft or another fastener, such as a rivet stake or the like), e.g., for coupling the hub to a trolley bracket assembly forming part of the conveyor system.

Certain embodiments provide a trolley assembly of a conveyor system. In the present embodiments, the trolley system comprises a support member for supporting an item being moved by the conveyor system, first and second trolley brackets coupled to the support member, and first and second trolley wheel assemblies coupled to the first and the second trolley brackets, respectively, for providing rolling engagement of the trolley assembly with a track of the conveyor system. In the present embodiments, each trolley wheel assembly includes a wheel having a central opening, a hub positioned within the central opening (the hub optionally having a shaft or another fastener coupling the hub to the first or second trolley bracket), and an open bearing assembly positioned within the central opening between the wheel and the hub. The bearing assembly provides relative rotational movement between the wheel and the hub. The wheel comprises a first face, a second face, and a rolling surface. In the present embodiments, the first and the second faces having inner edges (or inner boundaries or inner edge regions) adjacent to the central opening, and at least one of the faces has one or more surface features configured to facilitate (e.g., direct) flow of a fluid toward the open bearing assembly when cleaning the open bearing assembly.

Some embodiments provide a method of washing a trolley wheel assembly of an overhead conveyor system. In the present method, the trolley wheel assembly comprises a wheel and an open bearing assembly. The wheel has a first face, a second face, and a rolling surface. At least one of the first and the second faces has a funnel configuration shaped to direct fluid toward the open bearing assembly for cleaning the open bearing assembly. The method comprises spraying fluid at the wheel face having the funnel configuration so as to direct the sprayed fluid into the open bearing assembly, thereby flushing the open bearing assembly with sprayed fluid. In some of the present embodiments, the wheel face having the funnel configuration has a plurality of channels extending from an outer edge region of the first face toward the open bearing assembly. Additionally or alternatively, the funnel configuration can optionally have a plurality of ribs extending toward the open bearing assembly. Preferably, the wheel face having the funnel configuration is angled axially inward from an outer edge region of that wheel face toward an inner boundary of that wheel face. In some of the present embodiments, each wheel face is angled axially inward from an outer edge region of the wheel face toward an inner boundary of the wheel face, such that sprayed fluid is directed into the open bearing assembly and fluid that thereby enters the bearing assembly can flow freely downwardly along either face of the wheel.

Certain embodiments provide a trolley wheel assembly for use in a conveyor system. In the present embodiments, the trolley wheel assembly comprises a wheel having a central opening, an outer race positioned within the central opening, an inner race positioned within the outer race, and a plurality of bearing members (optionally balls) positioned in a single row between the inner race and the outer race. The bearing members provide relative rotational movement between the inner race and the outer race. The inner race and the outer race provide a raceway containing the bearing members. In the present embodiments, the trolley wheel assembly can optionally have an externally visible replacement indicator characterized by the trolley wheel assembly wearing to a condition in which the inner and outer races contact each other, at which point the bearing assembly has only a minor percentage of its useful life remaining. In embodiments of this nature, the inner race, outer race, and bearing members desirably all comprise metal, with the inner race and the bearing members having greater hardness than the outer race (the inner race and the bearing members optionally have a Rockwell C scale hardness of 48-60, while the outer race optionally has a Rockwell C scale hardness of 28-32). In some (but not all) of the present embodiments, the trolley wheel assembly includes directing means for directing a fluid into the raceway for cleaning the raceway and the bearing members. If desired, the outer race, inner race, and bearing members can collectively form an open bearing assembly, and the open bearing assembly can have a flow-through area of at least 0.018 square inch. Such an open bearing assembly can optionally have a gap into which fluid can be sprayed, and the gap can advantageously have a width of at least 0.07 inch. In some cases, the bearing members are the only things in the gap that reduce flow-through area. The trolley wheel assembly can optionally have a ratio of gap width to wheel radius of at least 0.04. If desired, the gap can have a total area of which flow-through area accounts for at least 5%, both of these areas being measured in a plane perpendicular to the wheel's axis.

BRIEF DESCRIPTION OF THE DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF PREFERRED EMBODIMENTS

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements; all other elements employ that which is known to those of ordinary skill in the field of the invention. Those skilled in the art will recognize that many of the noted examples have a variety of suitable alternatives.

Figure 1A:
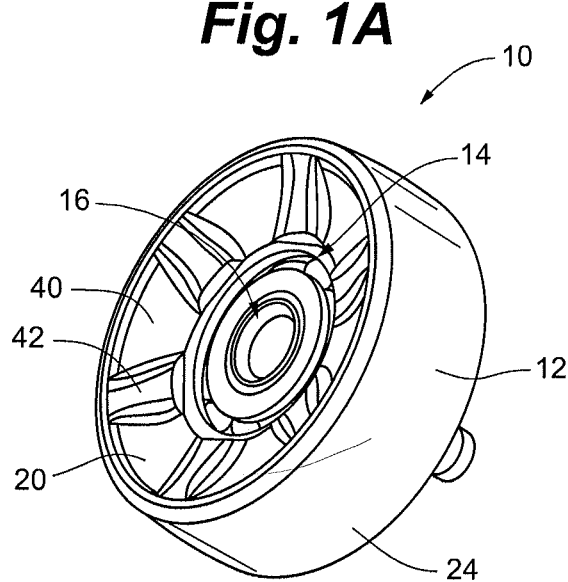
FIGS. 1A and 1B are perspective views of a trolley wheel assembly according to an embodiment of the invention.
Figure 1B:
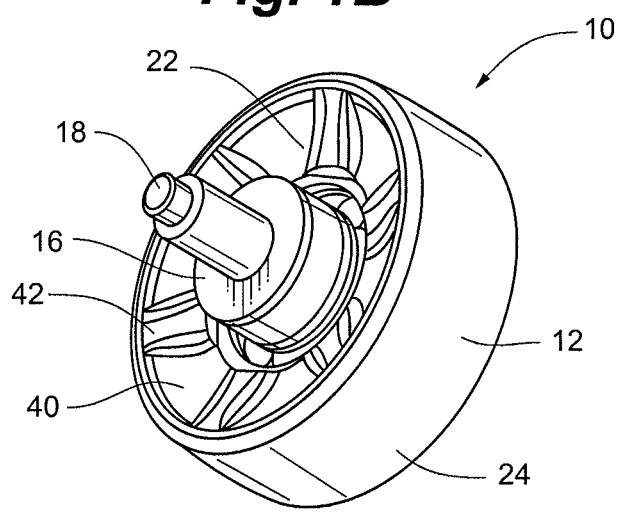

FIGS. 1A and 1B show front and back perspective views, respectively, of a trolley wheel assembly 10 according to an embodiment of the invention. The trolley wheel assembly 10 includes a wheel 12, a bearing assembly 14, and a hub 16. The illustrated hub 16 has a shaft 18 for coupling the trolley wheel assembly 10 to a trolley bracket, which forms part of a trolley assembly. Rather than the illustrated threaded shaft 18, the hub can be fastened with (or coupled to) a trolley bracket by other fasteners, such as a rivet stake or the like. Many other suitable connection options will be apparent to skilled artisans given the present teaching as a guide. The trolley wheel assembly 10 is useful for providing a trolley assembly with rolling engagement to a track, e.g., as part of a trolley conveyor system.

In some cases, the wheel 12 includes a first face 20, a second face 22, and a circumferential rolling surface 24, which can optionally extend between (and/or join) the first face 20 and the second face 22. The rolling surface 24 is a tread portion of the wheel and is configured to roll on a track of a conveyor system. The illustrated rolling surface 24 joins (e.g., extends between) outer edge regions 25, 27 of the first and the second faces 20, 22 of the wheel. The illustrated wheel also includes inner edges (or inner edge regions or inner boundaries) 21, 23 that are adjacent to a central opening of the wheel 12. The central opening receives the bearing assembly 14 and the hub 16.

Figure 1C:
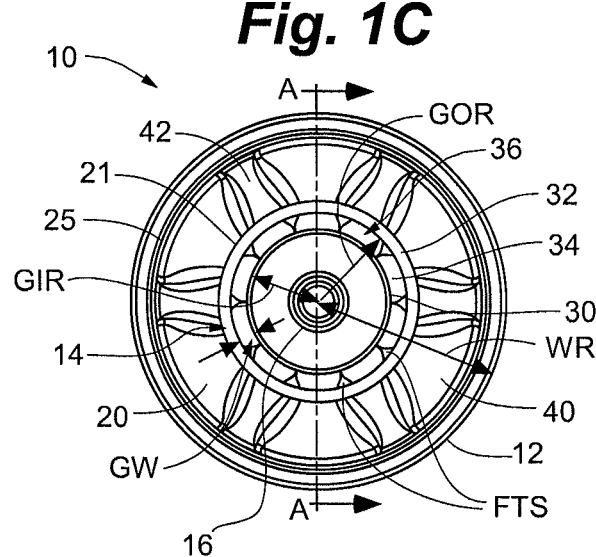
FIG. 1C is a side view of the trolley wheel assembly of FIGS. 1A and 1B.

Turning to FIG. 1C, in some embodiments the bearing assembly 14 includes (or optionally consists essentially of) an inner race 30, an outer race 32, and a plurality of bearing members (optionally a single row of balls or other bearing members) positioned between the inner and the outer races 30, 32. If desired, the inner race can be integral to the hub, the outer race can be integral to the wheel, or both. The bearing members provide relative rotational movement between the inner and the outer races. For example, the bearing members can comprise a plurality of load-bearing balls 34 contained within a raceway defined by the inner and the outer races 30, 32. In other embodiments, bearing members of different shape (e.g., cylindrical) may be used. Also, the bearing members can optionally be provided with a retainer or another bearing complement, if so desired.

Figure 7:
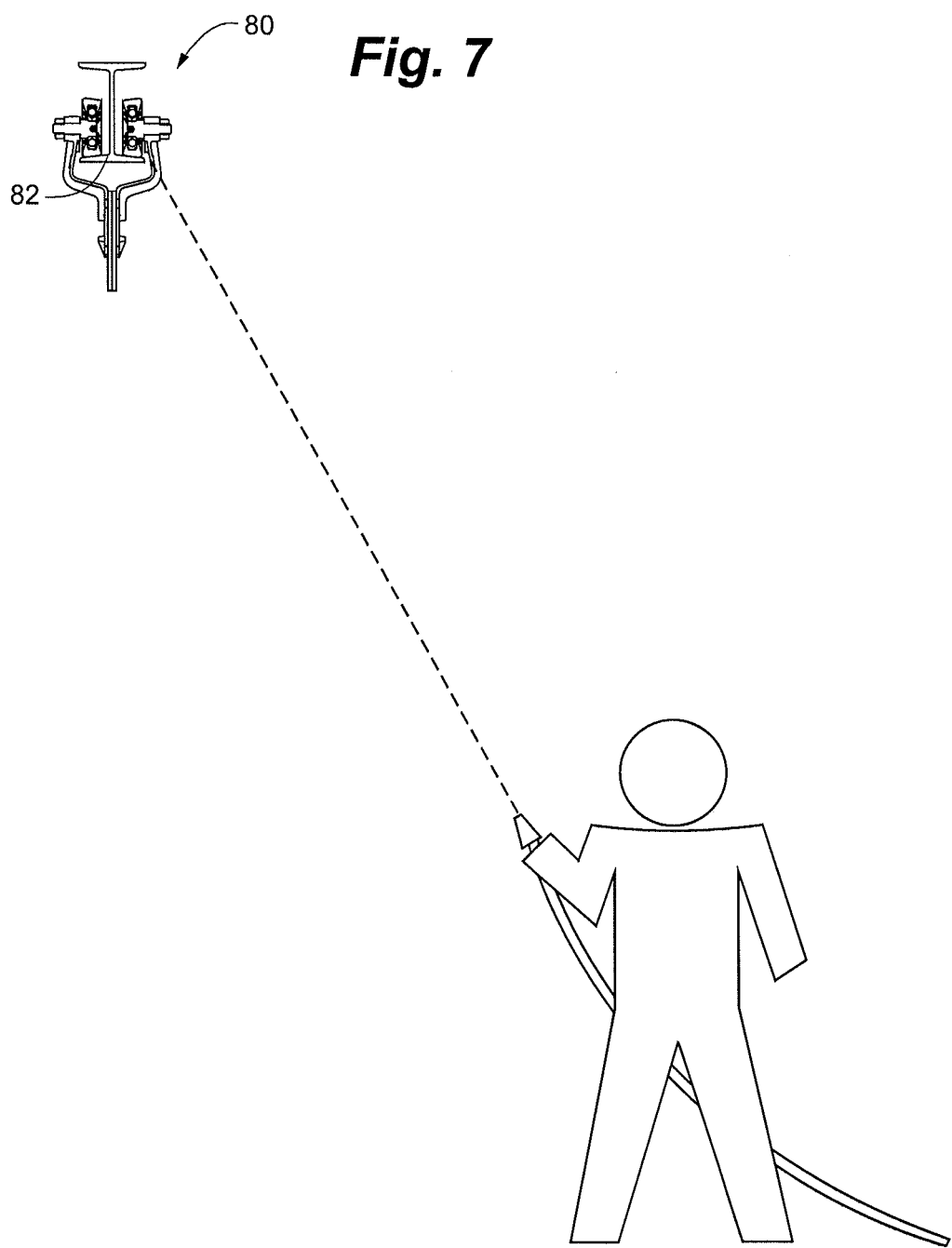
FIG. 7 is a schematic illustration of a method for washing a trolley wheel assembly of an overhead conveyor system in accordance with certain embodiments of the invention.

According to some embodiments, the bearing assembly 14 is an open bearing assembly, e.g., the raceway and bearing members (e.g., balls 34) can be accessible from (or exposed to, or open to) the surrounding environment of the trolley wheel assembly 10. As shown in FIG. 1C, in some cases the bearing assembly 14 includes a gap 36 (e.g., defined between inner and outer races 30, 32) that provides access (at least to fluid sprayed at the gap 36) to the raceway and the bearings. The open (or unsealed, or exposed) configuration of the bearing assembly 14 can be useful for periodically cleaning and/or lubricating the raceway and the bearings. For example, as a trolley assembly moves along a track in a conveyor system, the trolley assembly (including the trolley wheel assemblies incorporated therein) may pass through a cleaning and/or lubrication station in which water, a cleaning solution, or another fluid (e.g., air) is directed into the open bearing assemblies of the wheel assemblies to clean and/or lubricate the bearing assembly 14 and remove debris from the raceway. In some cases, maintenance personnel (or automated equipment) may spray fluid (optionally containing a detergent, sanitizing agent, or another cleaning solution) at each wheel assembly, e.g., so as to flush water through the open bearing assembly. Reference is made to FIG. 7.

According to some embodiments, one or both faces of the trolley wheel 12 include one or more surface features configured to facilitate (e.g., direct) flow of a fluid toward, into, and/or out of the bearing assembly 14. For example, the first and/or the second face may be configured to channel fluid directed at (e.g., sprayed at) the wheel 12 toward the bearing assembly 14. In some cases, the trolley wheel will be used on an overhead conveyor such that a person below (in some cases, at least four feet below) will be spraying water upwardly at the trolley wheel to clean it. In other cases, the water may be sprayed horizontally, or even somewhat downwardly, at the trolley wheel (e.g., if the location from which the water is sprayed is at about the same level as the track). Reference is again made to FIG. 7. By configuring the faces (or at least a face against which the spray is directed) so as to have a tapered configuration, the sprayed water is more apt to reach (and flush out) the bearings in the wheel assembly. Embodiments of this nature are advantageous in that they offer particularly good washability, e.g., in comparison to embodiments where there is no taper on the wheel's faces, in which case water sprayed from below is more likely to be deflected away from the gap 36, rather than flowing through the gap and cleaning the bearings and the raceway. In some cases, the same surface features may ease the outflow and drainage of fluids away from the bearing assembly 14, e.g., allowing fluid and debris to be more easily removed. For example, the first and second faces of the wheel 12 may have surface features configured to both direct fluid toward the bearing assembly and drain fluid and debris out from the bearing assembly. In addition to directing fluid toward and/or away from the bearing assembly, in some embodiments the surface features may also increase heat transfer away from the bearing assembly 14 during use. For example, the wheel's profile may create airflow patterns (during use) that increase heat transfer from the wheel.

Referring again to FIGS. 1A-1C, in some embodiments the surface features comprise a number of channels 40 that extend toward an inner boundary (e.g., an inner edge) 21 of the wheel's first face 20. (Although the following describes surface features with respect to the first face 20, the discussion is equally applicable to the second face 22, and it is to be understood that the second face can optionally have similar surface features instead of, or in addition to, the first face.) Thus, one or both faces of the wheel can have the desired surface features. In the illustrated embodiment, channels 40 are formed in the first face 20 so as to extend between (optionally entirely between) an outer edge region 25 of the first face 20 and an inner edge 21 of the first face. This, however, is not required. For example, the channels may extend to the inner edge of the wheel face without extending to the outer edge region of the wheel face, e.g., the wheel face may have an annular outer portion (adjacent the outer edge region) that does not include the channels. Alternatively, the channels may extend toward, but not all the way to, an inner edge or inner boundary of the wheel face. For example, the wheel face may have an annular inner portion (adjacent an inner boundary of the wheel) that does not include channels. Moreover, the wheel face in some embodiments can simply have a taper (e.g., as part of a funnel configuration) without any channels.

In some embodiments, a channel 40 is bounded by an angled or tapered surface (of the wheel face) that aids in directing fluid toward the bearing assembly 14. As seen in the perspective views of FIGS. 1A and 1B and the cross-sectional view of FIG. 1D, the channel 40 can optionally be bounded by an angled surface that extends (or is sloped) axially inward (e.g., toward the opposite face of the wheel) as the channel extends toward an inner boundary 21 of the wheel face. In embodiments of this nature, when fluid is sprayed at the face of the wheel 12, the channel(s) 40 and angled surface(s) of the wheel face direct the fluid toward the bearing assembly 14. This includes a funneling action, and such a tapered wheel face can therefore be described as having a funnel configuration. The angled surface(s) of such a wheel face (and/or ribs 42, as will be described below) can also reduce the amount of material needed to form the wheel 12, thus advantageously reducing the weight of the wheel while providing increased wheel strength. Although the figures show both channels and angled surfaces, the wheel face in some embodiments may have either channels or an angled surface, but not both.

The angled surfaces bounding the channels 40 can have a variety of angles and are not limited to any particular contour. As shown in the figures, the angled surfaces can optionally have a radius of curvature. In other embodiments, the channel 40 may be bounded by an angled surface that slopes linearly at a constant angle toward the inner boundary 21 of the wheel face 20. The degree of angle (e.g., slope or curve) may vary depending upon the size of the wheel 12 and/or the particular application for which the wheel is designed. In one example, a wheel 12 with an outside diameter of about two inches has a plurality of channels 40 bounded by a surface with a radius of curvature of about a half inch (e.g., 0.45 inch).

In certain embodiments, the wheel has at least one face with one or more angled surfaces that facilitate (e.g., direct) flow of fluid toward and/or away from the bearing assembly 14. In these embodiments, the wheel can have a tapered configuration, as is perhaps best seen in FIGS. 1D, 5B and 5C. The general (or average tangent) angle can optionally be at least 1 degree, at least 2 degrees, at least 5 degrees, at least 10 degrees, at least 15 degrees, or more. This angle is as measured from a plane perpendicular to the wheel's axis of rotation. Thus, in embodiments where both wheel faces are angled inwardly, the width of the wheel (i.e., the distance between the first and second faces) can optionally be greatest adjacent the outer edge region 25, 27 of the wheel, and the width may decrease gradually with increasing distance toward an inner boundary (e.g., an inner edge) 21, 23 of the wheel face. Thus, in a radial cross section, such a wheel can optionally have a generally triangular shape (reference is made to FIGS. 5B and 5C).

According to some embodiments, the channel 40 has a width that decreases as the channel extends toward the inner boundary (e.g., edge) 21 of the wheel face 20. Referring to FIG. 1C, the illustrated channel 40 has a maximum width near the outer edge region 25 of the first face 20 and a minimum width near the inner boundary 21 of the wheel face 20. The decreasing width of the channel 40 can collect and direct fluids from near the outer edge region 25 of the first face toward the inner boundary 21 (and thereby toward the bearing assembly 14). It is to be appreciated, however, that this decreasing channel width feature is not required, even in those embodiments that include channels.

According to some embodiments, the surface features on the first and/or second face of the wheel 12 may include one or more ribs 42 that extend toward an inner boundary (or inner edge) 21 of the wheel face. In some cases, the ribs 42 bound channels 40 like those described above. Each rib 42 may have an angled surface that extends axially inward toward the inner edge 21 of the wheel face. In embodiments of this nature, the channels reduce the amount of material needed to form the wheel 12, e.g., when compared to a wheel having a flat face perpendicular to the axis of wheel rotation and the ribs provide the wheel with increased strength. Wheel profiles of this nature may also facilitate heat transfer away from the wheel during use, due to air flow characteristics caused by the wheel's contour.

Figure 1D:
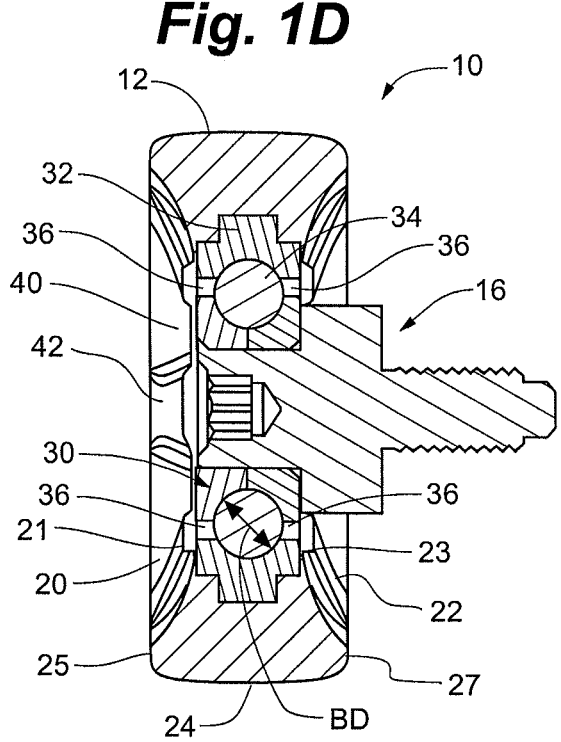
FIG. 1D is a cross-sectional view of the trolley wheel assembly of FIGS. 1A and 1B.

In some embodiments involving both channels and ribs, the surface of each rib 42 has a contour that is different than the contour of the surface bounding each channel 40. For example, as shown in FIG. 1D, the surfaces of the ribs 42 can optionally have a substantially linear slope between outer and inner edges 25, 21 of the first face, while the surfaces bounding the channels 40 have a radius of curvature.

The first and/or second faces of the wheel 12 can have any suitable number of surface features to facilitate (e.g., direct) flow of fluid toward the bearing assembly 14, and the invention is not limited to any specific number or types of surface features. In some embodiments, alternating ribs 42 and channels 40 (i.e., ribs and channels provided in an alternating pattern moving in sequence circumferentially about the wheel face) are provided. As shown in FIGS. 1A-1D, some embodiments involve a configuration with six channels 40 and six ribs 42. However, other numbers of channels and/or ribs can be used depending upon the type of flow desired, the size of the wheel, the strength of the material, etc. Moreover, in certain alternate embodiments, the channels and ribs have a pinwheel type design, e.g., such that the channels and/or ribs have a somewhat spiral configuration, optionally designed to facilitate circular motion of fluid sprayed at the wheel face. Many other appropriate wheel face contours will be apparent to skilled artisans given the present teaching as a guide.

As already explained, the open bearing assembly has a gap 36 into which fluid can be sprayed (e.g., when cleaning the wheel assembly). In certain embodiments, the gap 36 has a width of at least 0.05 inch, at least 0.07 inch, at least 0.08 inch, at least 0.082 inch, at least 0.085 inch, at least 0.087 inch, at least 0.09 inch, or at least 0.1 inch. The gap width is measured along a radius of the wheel, and in the illustrated embodiments is equal to the gap outer radius GOR minus the gap inner radius GIR (see FIGS. 1C, 2B, 3B, and 3C).

In some preferred embodiments, the only things in the gap 36 that would restrain water flow from one side of the wheel to the other are the bearings 34. Thus, the bearings in such embodiments are the only things in the gap that reduce flow-through area. This is perhaps best understood with reference to FIGS. 1C and 1D.

Some embodiments provide the trolley wheel assembly with a ratio of gap width GW to wheel radius WR (see FIG. 1C) of at least 0.03, at least 0.04, at least 0.05, at least 0.06, at least 0.075, at least 0.09, or at least 0.1. One exemplary wheel assembly has a wheel radius of about 1.18 inches (30 mm) and a gap width of about 0.083 inch, such that the ratio of gap width to wheel radius is about 0.07. Another exemplary wheel assembly has a wheel radius of about 0.98 inch (25 mm) and a gap width of about 0.0875 inch, such that the ratio of gap width to wheel radius is about 0.09.

In certain embodiments, the trolley wheel assembly has an open bearing assembly characterized by a significant flow-through area. This is perhaps best appreciated by referring to FIG. 1C. Here, the open bearing assembly has a gap 36, and there are significant spaces ("flow-through spaces") FTS between adjacent bearings 34. A person looking through these spaces FTS from one side of the wheel assembly can see all the way through the gap and beyond the wheel's opposite side. Water sprayed at the wheel can thus pass through these spaces during washing. The "flow-through area" is the combined area of all the flow-through spaces FTS (such area being measured in a plane perpendicular to the wheel's axis).

In certain embodiments, the flow-through area is at least 0.01 square inch, at least 0.02 square inch, at least 0.022 square inch, at least 0.024 square inch, at least 0.025 square inch, at least 0.026 square inch, at least 0.028 square inch, at least 0.030 square inch, or at least 0.035 square inch. Moreover, in embodiments where the wheel assembly has a single row of bearings (this is not required in all embodiments), a substantially constant flow-through area can be maintained at all times, since bearings of different rows are not available to shift positions relative to one another so as to change the amount of flow-through space.

Further, in some embodiments, the wheel assembly is configured such that flow-through area accounts for a substantial percentage of the total gap area. For example, the ratio of flow-through area to total gap area may be at least 0.03, at least 0.05, at least 0.06, at least 0.07, at least 0.09, at least 0.1, at least 0.125, at least 0.15, or at least 0.17 (such areas being measured in a plane perpendicular to the wheel's axis). One exemplary embodiment provides a 60 mm outer diameter wheel with a flow-through area of about 0.024 square inch and a total gap area of about 0.314 square inch, giving a ratio of flow-through area to total gap area of about 0.076. Another exemplary embodiment provides a 50 mm outer diameter wheel with a flow-through area of about 0.030 square inch and a total gap area of about 0.229 square inch, giving a ratio of flow-through area to total gap area of about 0.131.

According to some embodiments, the trolley wheel 12 comprises (or consists essentially of) a polymeric material (e.g., polyacetal, polypropylene, UHMW, nylon or a variety of other elastomeric materials). Manufacturing the wheel 12 from a polymer can minimize corrosion, weight (thereby also reducing the necessary driving power), noise, track wear and cost. Preferably, the surfaces of the wheel are smooth to minimize debris retention.

A fill can advantageously be added to the polymer to increase the strength and load-bearing capacity of the wheel 12. In some embodiments, the wheel comprises (or consists essentially of) polymer and a filler, with the filler optionally being present in an amount between about 5% and about 25% by weight, such as between about 5% and about 15% filler by weight (the filler can comprise, for example, a glass). The inventors generally prefer to avoid higher fill levels, e.g., so as to avoid the wheel being too brittle. As just one example, the wheel can be formed of a glass-filled (e.g., about 5%, about 15%, or about 25% glass filled) polyacetal to increase the strength, heat resistance, and/or moisture resistance of the wheel. Thus, certain embodiments provide a trolley wheel comprising polymer and filler at the noted levels, regardless of whether the wheel has a wash-through profile (which is provided in combination with the noted fill levels in certain embodiments), the optional hardness arrangement disclosed herein (the noted fill levels are provided in combination with the optional hardness arrangements in certain embodiments), or any particular dimensions disclosed herein. In other words, the present filler embodiments extend to any trolley wheel having the polymer and fill levels of the nature described here, regardless of the particular configuration or design of other aspects of the trolley wheel.

Filler can be advantageously provided within the noted fill ranges. Since the wheel rides on a track, conventional wisdom suggests that filler should be avoided, so as to avoid damaging the track (replacing such track is a major expenditure, so damage to the track is avoided keenly). The present inventors, however, have discovered that the fill ranges noted here can minimize such problems while providing improvements in terms of withstanding heat and avoiding flat spots. For example, when the present wheel assembly is used on a conveyor track that turns, changes in elevation, or both, additional force on the wheel may cause it to drag for a short time. If this happens enough, a flat spot may be created on the wheel, which if allowed to get severe enough may lead to failure. By providing a filler that increases the strength of the wheel material (as compared to a wheel consisting only of the polymer), the filler increases the wheel's resistance to the formation of flat spots. Further, the additional strength provided by the filler can be particularly advantageous for embodiments where the wheel has a taper or some other reduced wall thickness (which may result from giving the wheel an advantageous flow-through profile). Further, providing filler as taught above contributes to the wheel's ability to wear evenly. Still further, in embodiments involving a polymer wheel and a metal outer race, the filler can make the wheel more heat resistant, thereby reducing the likelihood of the polymer wheel melting or at least softening, and thereupon separating from (or otherwise rotating relative to) the metal outer race. Thus, in certain embodiments, the wheel is provided with a filler having a higher melting point than the base polymer from the wheel is formed. Skilled artisans would be readily able to select many suitable combinations of polymers and fillers given the present teaching as a guide.

In some embodiments, the wheel 12 is manufactured via injection molding. In one example, plastic material is injected into a multi-cavity tool around an outer race 32 (which comprises or consists essentially of metal) to permanently encapsulate the outer race 32 within the wheel 12. In embodiments where a polymer wheel is bonded to a metal outer race, the bond between those parts can be a mechanical bond, a chemical bond, or both. Thus, in some embodiments, the wheel is coupled to (e.g., joined to) an outer race of the bearing assembly such that the wheel and the outer race rotate together as a single unit during use. In alternate embodiments, a single integral body defines the wheel and the outer race.

Figure 2A:
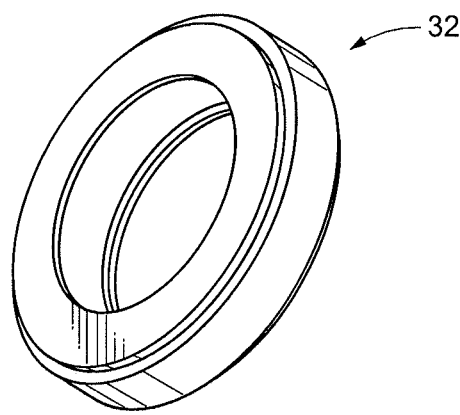
FIG. 2A is a perspective view of an outer race according to an embodiment of the invention.
Figure 2B:
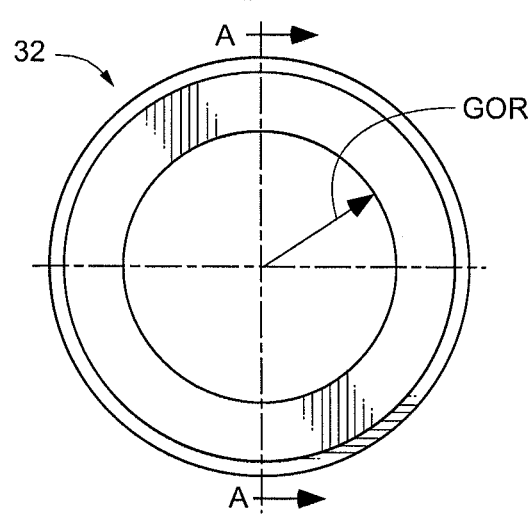
FIG. 2B is a side view of the outer race of FIG. 2A.
Figure 2C:
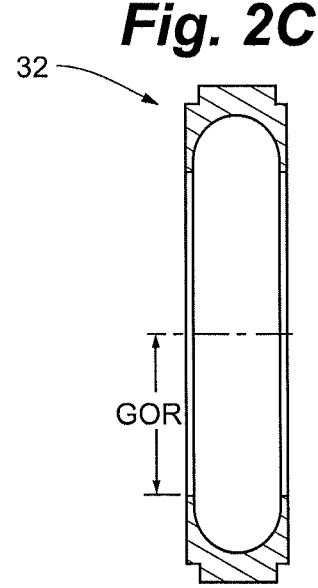
FIG. 2C is a cross-sectional view of the outer race of FIG. 2A.

Turning to FIGS. 2A-3D, one example of a bearing assembly 14 will be discussed. In FIGS. 2A-2C, various views of an outer race 32 are shown. The outer race 32 includes side and circumferential walls forming an annular cavity adapted to receive a number of anti-friction bearing members in cooperation with an inner race 30. In some embodiments, the outer race 32 is made of steel (e.g., various alloys or stainless varieties). In some cases, the steel is hardened via heat treating and/or plated with one or more coatings such as zinc, chrome, etc., to maximize strength and corrosion resistance, and/or to minimize friction. If desired, the outer race 32 can be machined from bar stock or tube, hot forged and subsequently machined and optionally ground. As just one example, an outer race 32 may be formed of a hardened martensitic AISI420 stainless steel that is machined from bar tubing, hardened via heat treating and subsequently ground. Of course, a wide variety of other materials can be used based upon the desired performance capability, cost, and/or availability of materials. Thus, the scope of the invention is by no means limited to any particular materials or fabricating methods.

Figure 3A:
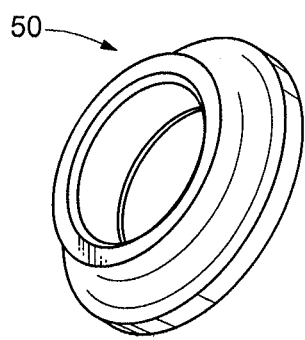
FIG. 3A is a perspective view of an inner race member according to an embodiment of the invention.
Figure 3B:
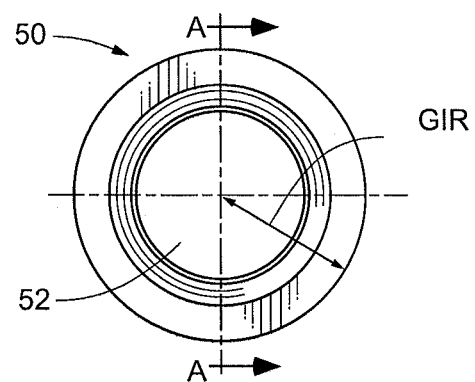
FIG. 3B is a side view of the inner race member of FIG. 3A.
Figure 3C:
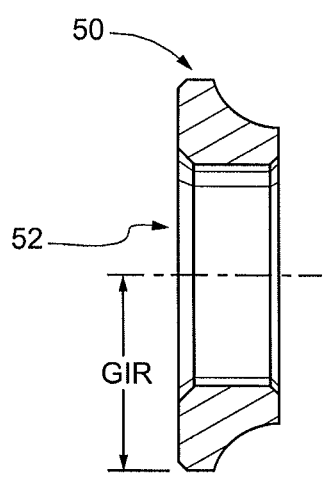
FIG. 3C is a cross-sectional view of the inner race member of FIG. 3A.
Figure 3D:
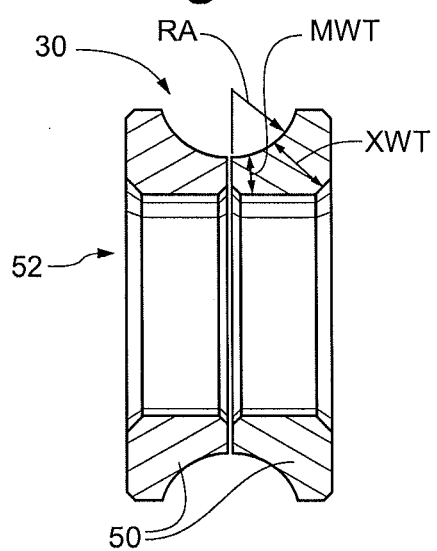
FIG. 3D is a cross-sectional view of an inner race incorporating the inner race member of FIG. 3A according to an embodiment of the invention.

Referring to FIG. 3D, in some cases the inner race 32 is a split race, which is formed by a pair of inner race members 50. FIGS. 3A-3C show various views of the inner race member 50 according to an embodiment of the invention. The inner race members 50 generally have an annular configuration with an opening 52 in the center for receiving the hub 16. In some embodiments, the inner race members 50 are comprised of steel and may be machined or forged from the same variety of steel materials as the outer race 32 in order to maximize strength and corrosion resistance, and/or to minimize friction. In one embodiment, the inner race members 50 are cold forged from AISI420 stainless steel wire rod and subsequently heat treated. Of course, a wide variety of other materials can be used based upon the desired performance capability, cost, and/or availability of materials. The scope of the invention is not limited to any particular materials or fabricating methods for the inner race or any other component or portion of the present assemblies.

Certain embodiments provide a fortified inner race having wall dimensions that have been found to provide surprising performance and durability levels. Reference is made to FIG. 3D. For example, the inner race can optionally have a minimum wall thickness MWT that is greater than 0.06 inch, greater than 0.08 inch, or even greater than 0.09 inch. Additionally or alternatively, the inner race can optionally have a maximum wall thickness XWT of at least 0.09 inch, at least 0.1 inch, or at least 0.11 inch. In some cases, these minimum and maximum wall thicknesses are measured along an axis (one example is shown in FIG. 3D) parallel to a radius of a ball bearing received by the inner race. Dimensions of this nature can optionally be provided in combination with the noted hardness arrangement, and/or with a wash-through profile, and/or with the noted polymer fill levels, and/or with the optional dimensions for flow-through area, gap, etc. For wheels having an outer diameter of about 50-60 mm, the thickness XWT can, for example, be around 0.09-0.13 inch. These dimensions, however, are merely examples.

Returning to FIGS. 1C and 1D, the bearing assembly 14 in this embodiment includes a number of bearing members in the form of load-bearing balls 34 contained in the raceway formed by the inner and outer races 30, 32. Various suitable load-bearing balls are available for purchase from well known suppliers and are well known in the art. The bearing members can be provided with or without a bearing retainer, as will be fully understood by those of ordinary skill in this art. In some embodiments, the balls 34 are formed of the same materials as the inner and the outer races 30, 32. In one example, the balls 34 comprise a hardened martensitic AISI420 stainless steel, although a variety of steel materials can be used. The number and size of the balls can vary depending upon the specific embodiment. In one exemplary embodiment incorporating a 50 mm wheel, the bearing assembly 14 includes ten (10) Ø ¼" balls. In another example, a wheel measuring 60 mm may include a bearing assembly having twelve (12) Ø 5/16" balls. Of course, any number of balls (optionally with or without compliment), as well as various sizes and materials, can be used based upon the desired performance capability, cost, and/or availability of materials. In addition, in some embodiments the bearing members are not balls, but are instead another type of bearing member known in the art. For example, the bearing members may be cylindrical rollers.

As shown in the figures, some embodiments of the invention are directed to a trolley wheel assembly 10 incorporating an open bearing assembly 14 having only a single row of bearings. A single row of bearings can be particularly advantageous for cleaning purposes when provided in combination with the desired surface features on the first and/or the second faces of the wheel 12. For example, it may be easier to wash debris out from the raceway when a single row of bearings is used than when two or more rows of bearings are used. A single row of bearings can also be advantageous from the perspective of reducing friction. In broad aspects of the invention, though, any number of rows of bearings (e.g., balls) can be used.

In certain embodiments, the wheel assembly has an inner race, outer race, and bearings all comprising metal (while the wheel optionally comprises a polymer, which may have the filler levels disclosed herein), and the outer race has a lesser hardness than the inner race and the bearings. Embodiments of this nature are particularly advantageous when a single row of ball bearings is used. In certain preferred embodiments of this nature, the inner race and the bearings have a Rockwell C scale hardness of 48-60 (e.g., the inner race may have a Rockwell C scale hardness of 55-60 and the bearings may have a Rockwell C scale hardness of 48-56), while the outer race has a Rockwell C scale hardness of 28-32. In other embodiments, the hardness for the inner race, bearings, and/or outer race (optionally the hardness for each of these) is outside the noted ranges, such as up to 10%, 15%, or 20% plus or minus (e.g., up to 20% less than the lower end of each such range, or up to 20% higher than the upper end of each such range).

Figure 8A:
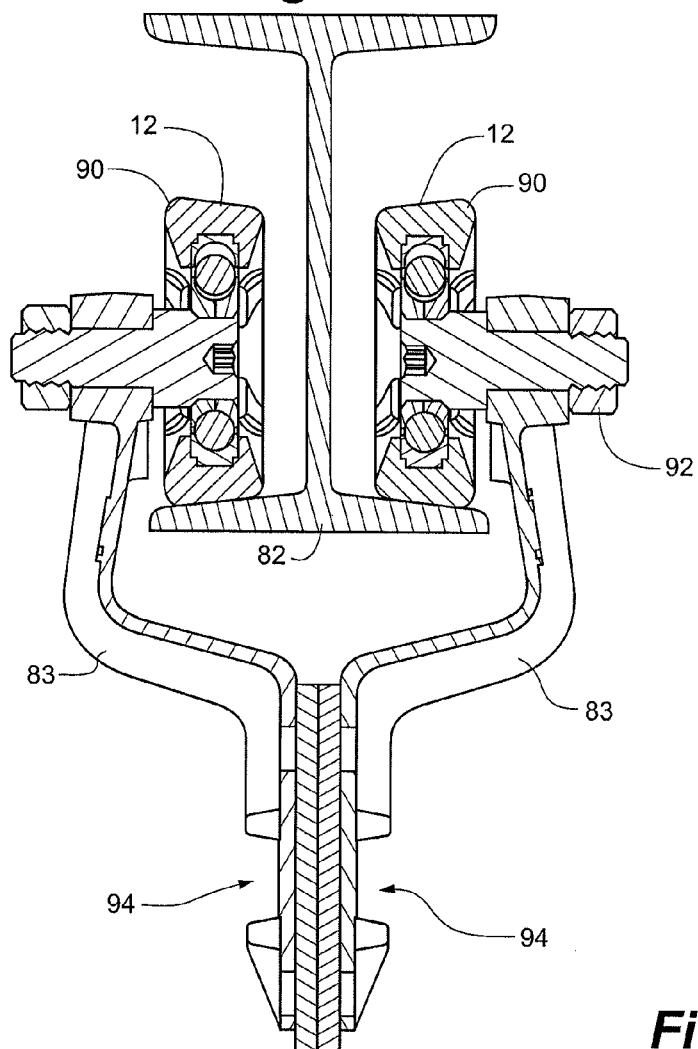
FIG. 8A is a cross-sectional view of a trolley assembly on a track according to certain embodiments of the invention, the wheel assemblies here being at a replacement stage.
Figure 8B:
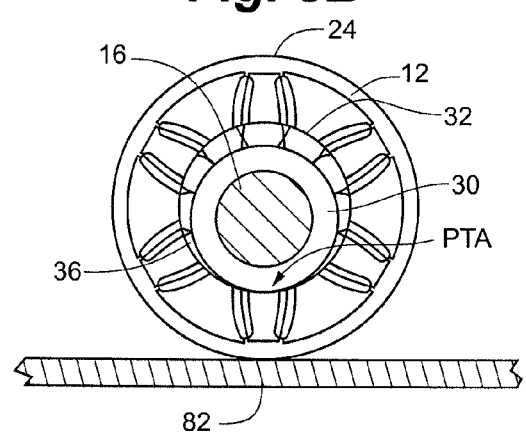
FIG. 8B is a side view of the wheel assembly of FIG. 8A, showing contact between inner and outer races of the wheel assembly.
Figure 9:
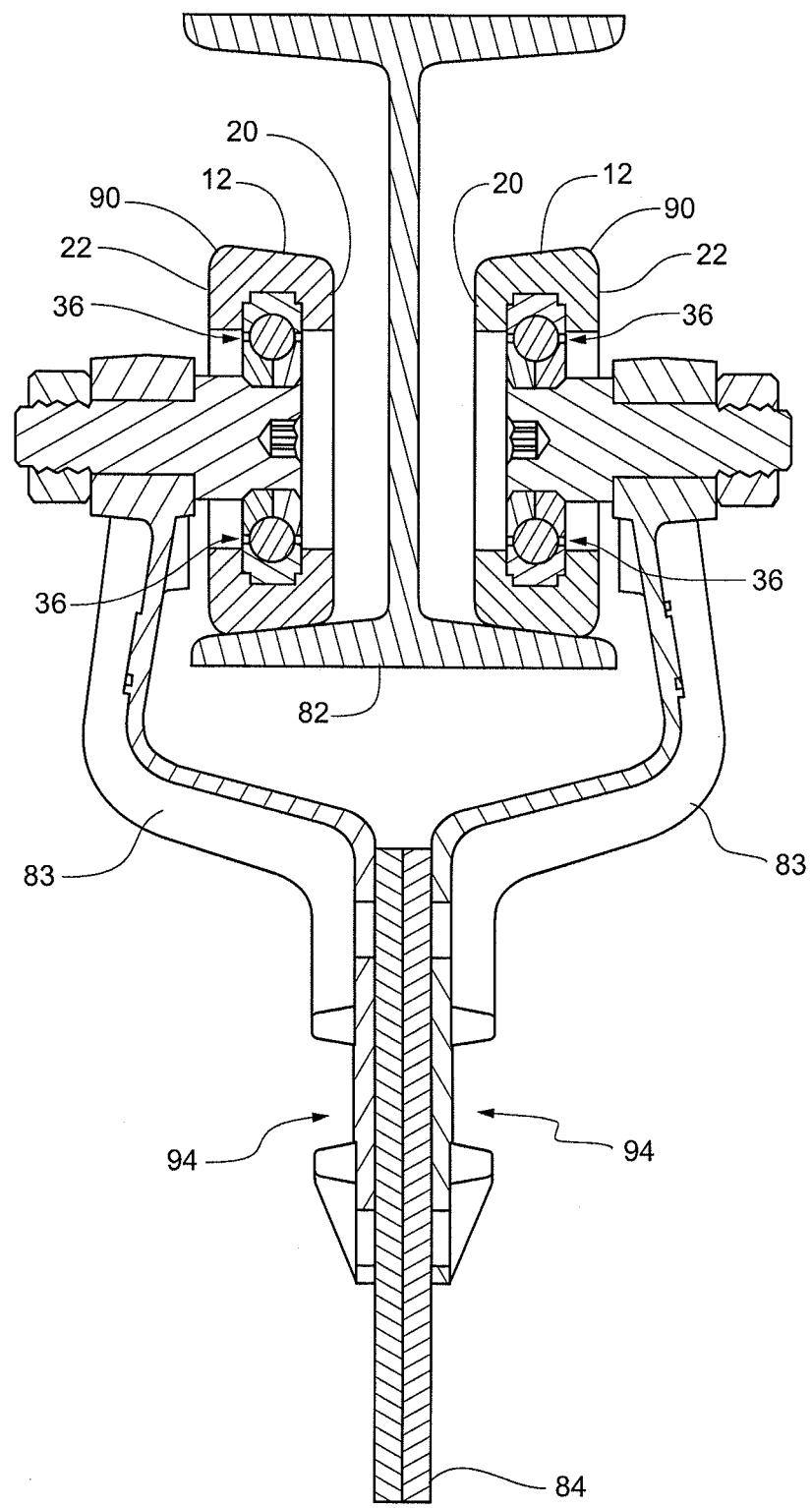
FIG. 9 is a cross-sectional view of a trolley assembly on a track in accordance with certain embodiments of the invention wherein the wheel configuration does not involve a tapered wash-through design.

Applicants have discovered that embodiments of this nature will wear to a failure point where the outer and inner races will be rubbing against one another. This provides an advantageous externally visible replacement indicator, e.g., the trolley wheel assembly wears to a condition in which the inner and outer races contact each other, at which point the bearing has a minor percentage (i.e., less than 50%, preferably less than 25%, and perhaps 20% or less) of its useful lifetime remaining Reference is made to FIGS. 8A and 8B, which depict one exemplary embodiment wherein the wheel assemblies have worn to such an externally visible replacement stage. Here, it can be seen that the inner 30 and outer 32 races are in contact with each other. Once a wheel assembly wears to this point, it is visibly apparent that replacement should be carried out. This provides an advantageous early alert that the wheel is worn and should be replaced. The bearings preferably have a diameter BD (see FIG. 1D) large enough that they cannot escape the raceway (and the gap preferably is small enough that the bearings cannot escape) if the wheel assembly is replaced promptly at the specified replacement stage. This can guard against falling debris. The present invention extends to any trolley wheel assembly of the nature described in this paragraph whether or not the wheel has a wash-through profile of the nature described above (FIG. 9 depicts an embodiment where the present hardness arrangement is provided, but the wheel does not have taper, channels, ribs, etc.) or the optional dimensions noted herein for flow-through area, gap, etc. In some embodiments, the wheel assembly has both the noted hardness arrangement and a wash-through profile, optionally together with the dimensions noted herein for flow-through area, gap, etc. and/or together with the noted polymer fill levels.

One exemplary embodiment provides a 60 mm outer diameter wheel with a single row of 12 balls (5/16 inch, 420SS, no bearing retainer as illustrated), an inner race of the type illustrated formed of 420SS cold headed and through-hardened, and an outer race of the type illustrated formed of 420SS forged, through-hardened, and ground. Another exemplary embodiment provides a 50 mm outer diameter wheel with a single row of 10 balls (¼ inch, 420SS, no bearing retainer as illustrated), an inner race of the type illustrated formed of 420SS cold headed and through-hardened, and an outer race of the type illustrated formed of 420SS forged, through-hardened, and ground. It is to be appreciated that these parameters are by no means limiting to the invention; they are merely examples.

Figure 4A:
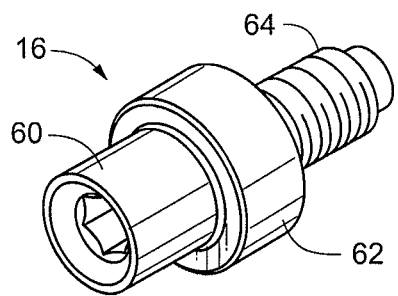
FIG. 4A is a perspective view of a hub according to an embodiment of the invention.
Figure 4B:
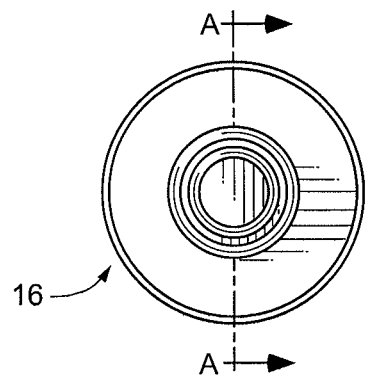
FIG. 4B is an end view of the hub of FIG. 4A.
Figure 4C:
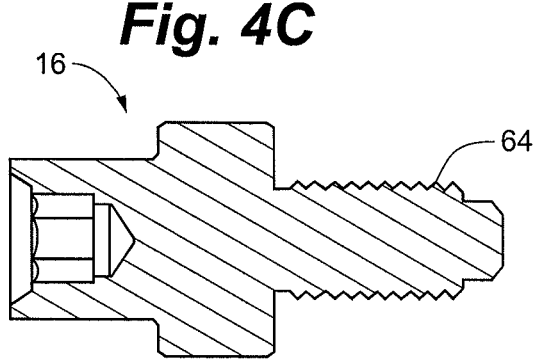
FIG. 4C is a cross-sectional view of the hub of FIG. 4A.

Referring to FIGS. 4A-4C, various views of a hub 16 are shown according to an embodiment of the invention. The illustrated hub 16 includes a cylindrical member (e.g., a cylindrical portion or body) 60 that is received within the opening 52 of the inner race and a flanged spacer 62 that spaces the trolley wheel assembly 10 from a trolley bracket. In some embodiments, the hub 16 also includes a shaft 64 for coupling the hub 16 to a trolley bracket. For example, the shaft 64 can have external threading and may be fastened to a trolley bracket with a corresponding nut (see FIG. 6). Thus, in some embodiments, the wheel assembly has a shaft projecting away from only one side of the wheel (rather than having shafts, or shaft portions, projecting away from both sides of the wheel). Reference is made to FIG. 1D. In some cases, the hub 16 is made of steel and is machined or forged from the same variety of steel materials as the inner race members 50 in order to maximize strength and corrosion resistance or to minimize cost. The hub 16 can be assembled together with the inner race 30 using an automated staking process in which material of the hub is swaged into an engineered receptacle (chamfer) on the back side of the inner race 30. In some embodiments, the hub 16 is cold forged from wire rod in a low carbon steel, heat treated and coated. A variety of coatings can be used. Two examples of coatings include zinc dichromate coupled with a sealer and zinc combined with trivalent yellow chromate. Of course, a wide variety of other materials, processes, and finishes can be used based upon the desired performance capability, cost, and/or availability of materials. The details associated with any particular combination of materials, processes, and/or finishes are by no means limited to the invention.

Thus, in some embodiments, the wheel assembly includes a hub coupled to (e.g., joined to) an inner race of the bearing assembly to form a hub/inner race subassembly that does not rotate about the wheel's axis during use. In alternate embodiments, a single integral body defines both the inner race and hub.

Figure 5A:
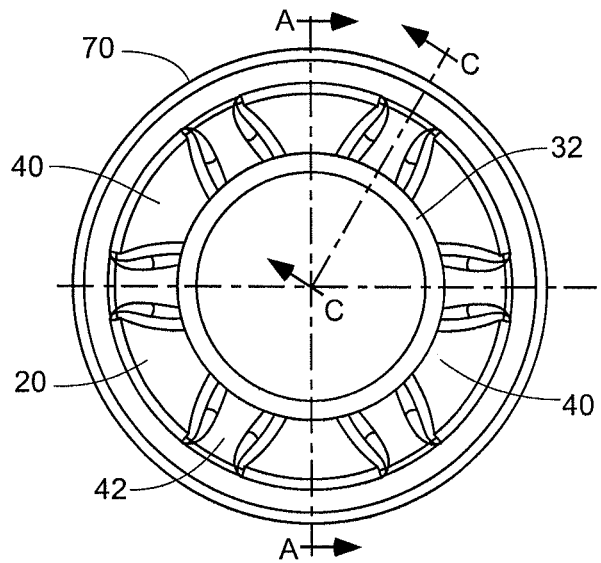
FIG. 5A is a side view of a wheel according to an embodiment of the invention.
Figure 5B:
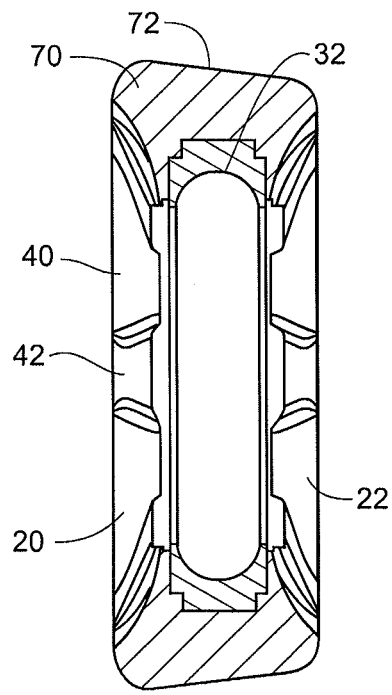
FIGS. 5B and 5C are cross-sectional views of the wheel of FIG. 5A.
Figure 5C:
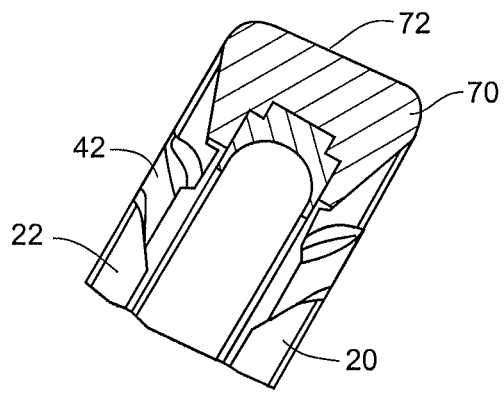

Returning to FIG. 1D, the trolley wheel 12 can be configured to accommodate the track upon which the trolley wheel 12 will roll. As shown in FIG. 1D, in some embodiments the rolling surface 24 of the wheel 12 has a symmetrical crowned profile that is adapted to ride on a flat track surface. Turning to FIGS. 5A-5C, another configuration of a wheel 70 is shown wherein the rolling surface 72 of the wheel 70 has a beveled mating profile to ride on either side of a sloped I-beam surface. The illustrated wheel 70 includes a number of surface features in the form of channels 40 and ribs 42 like the embodiment shown in FIGS. 1A-1D.

Figure 6:
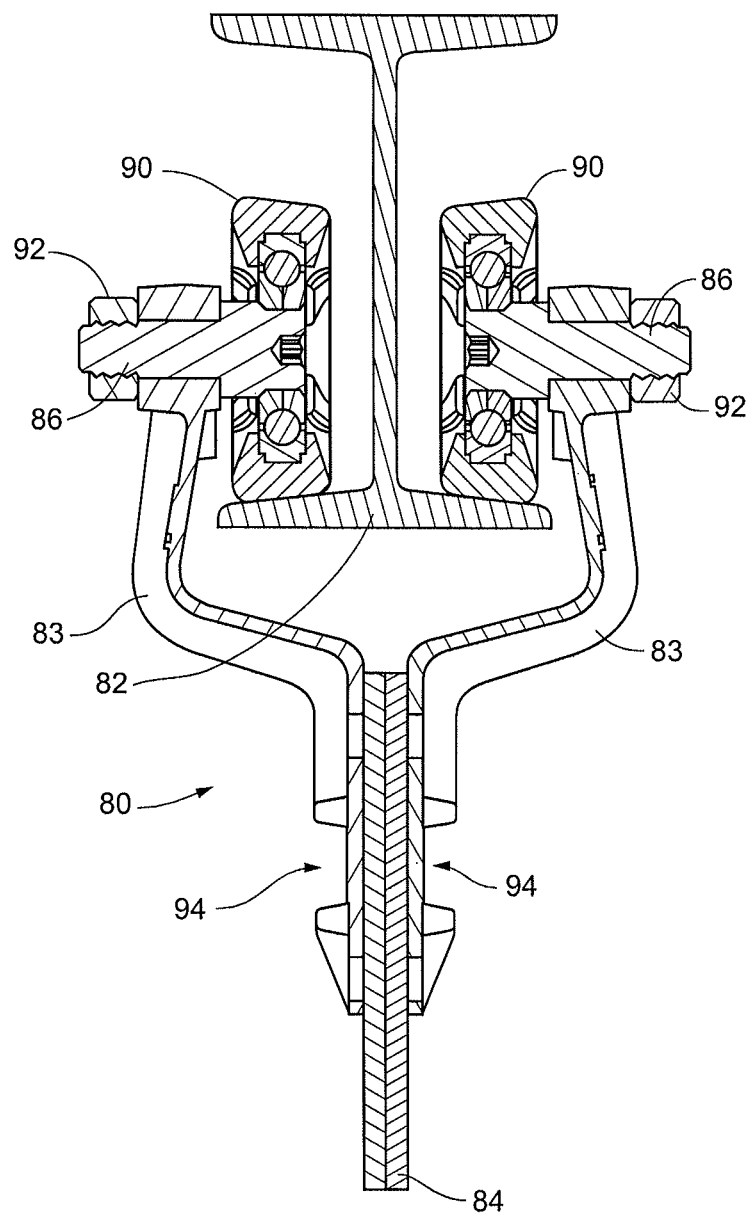
FIG. 6 is a cross-sectional view of a trolley assembly positioned on a track according to an embodiment of the invention.

FIG. 6 is a cross-sectional view of a trolley assembly 80 riding on a track 82 (e.g., the bottom surface of an I-beam) that forms part of a conveyor system. The trolley assembly 80 includes symmetrical trolley brackets 83 coupled to a support member 84 that may be configured to suspend an item from the trolley assembly 80. Each trolley bracket includes an opening 86 adapted to receive the shaft of the hub 16 of a trolley wheel assembly 90. A fastener 92 (e.g., an internally threaded nut) couples to the hub shaft 64 to retain the shaft within the bracket opening 86. The trolley assembly 80 is thus configured to ride upon the track 82, suspending an item from the support member, with the trolley wheels in rolling engagement with the track 82 to provide movement of the suspended item. In some cases, the trolley assembly 80 further includes a chain engaging portion 94 that engages a drive chain for moving the trolley assembly with respect to the track 82.

The invention also provides methods for cleaning a trolley wheel assembly of any type described above. For examples, certain embodiments provide a method of washing a trolley wheel assembly of an overhead conveyor system. In some embodiments of this nature, the wheel assembly being washed is located at an elevation at least 5 feet, at least 7 feet, or at least 10 feet higher than the floor on which a person doing the spraying is standing. In some cases, the washing method may be automated.

In the present washing methods, the trolley wheel assembly comprises a wheel and an open bearing assembly, the wheel comprises a first face, a second face, and a rolling surface, and at least one of the first and the second faces has a funnel configuration shaped to direct fluid toward the open bearing assembly for cleaning the open bearing assembly. Reference is made to FIG. 7. Here, it can be seen that the method involves spraying fluid upwardly at a wheel face having the funnel configuration (both wheel faces, of course, can have the same type of configuration, as explained above) so as to direct the sprayed fluid into the open bearing assembly, thereby flushing the open bearing assembly with sprayed fluid. Thus, when fluid is sprayed at a desired face of the wheel assembly, some of the fluid flows into (e.g., through a gap 36 of) the open bearing assembly, thereby washing the bearing assembly.

In embodiments of this nature, the wheel face at which the sprayed fluid is directed can have any of the above-noted configurations, surface features, or both. For example, the trolley wheel assemblies shown in FIG. 7 are illustrated as having the same surface features/face configuration as are shown in more detail in FIGS. 1A-1D, 5A-5C and 6. Thus, the wheel face with the funnel configuration can optionally have a plurality of channels extending from an outer edge region of the first face toward the open bearing assembly. Additionally or alternatively, the funnel configuration can optionally have a plurality of ribs extending toward the open bearing assembly. Preferably, the wheel face with the funnel configuration is angled axially inward from an outer edge region of that wheel face toward an inner boundary of that wheel face. As shown in FIG. 7, each wheel face can optionally be angled axially inward from an outer edge region of the wheel face toward an inner boundary of the wheel face, such that sprayed fluid is directed into the open bearing assembly and fluid that thereby enters the bearing assembly can flow freely downwardly along either face of the wheel.

In any embodiment noted above, the wheel can optionally have an outer diameter of less than 100 mm, less than 75 mm, or less than 70 mm, such as about 10-65 mm, optionally while being greater than 20 mm, greater than 30 mm, or greater than 40 mm. In other cases, though, the wheel diameter can be larger, depending upon the particular application.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A trolley wheel assembly for use in a conveyor system, the trolley wheel assembly comprising:
   a wheel having a central opening through which an axis of the wheel passes;
   a hub positioned within the central opening; and
   an open bearing assembly located within the central opening between the wheel and the hub, the open bearing assembly providing relative rotational movement between the wheel and the hub,
   wherein the wheel comprises a first face, a second face, and a circumferential rolling surface, the first and the second faces each having an inner boundary adjacent to the central opening and an outer edge region adjacent the circumferential rolling surface,
   wherein at least one of the first face and the second face has one or more surface features configured to facilitate flow of a fluid toward the open bearing assembly when cleaning the open bearing assembly, the one or more surface features comprising a plurality of channels extending along the wheel face between the outer edge region and the inner boundary of the wheel face, and
   wherein the open bearing assembly includes only a single row of bearings between the first face of the wheel and the second face of the wheel.

2. The trolley wheel assembly of claim 1, wherein each channel is bounded by an angled surface of the wheel face, the angled surface extending axially inward as the channel extends toward the inner boundary of the wheel face.

3. The trolley wheel assembly of claim 2, wherein the angled surface has a radius of curvature.

4. The trolley wheel assembly of claim 1, wherein each channel has a width that decreases as the channel extends toward the inner boundary of the wheel face.

5. The trolley wheel assembly of claim 1, wherein the wheel face is angled axially inward from the outer edge region of the wheel face toward the inner boundary of the wheel face, said one or more surface features also comprising a plurality of ribs extending toward the inner boundary of the wheel face.

6. The trolley wheel assembly of claim 1, wherein said one or more surface features comprise one or more angled surfaces located between the outer edge region of the wheel face and the inner boundary of the wheel face, the angled surface(s) extending axially inward toward the inner boundary of the wheel face.

7. The trolley wheel assembly of claim 6, wherein said one or more angled surfaces include a first group of surfaces having a first contour and a second group of surfaces having a second contour, the first contour having a substantially linear slope, the second contour having a radius of curvature.

8. The trolley wheel assembly of claim 1, wherein the open bearing assembly has a flow-through area of at least 0.018 square inch.

9. The trolley wheel assembly of claim 8, wherein the flow-through area is at least 0.025 square inch.

10. The trolley wheel assembly of claim 1, wherein the open bearing assembly has a gap into which fluid can be sprayed, the gap having a width of at least 0.07 inch.

11. The trolley wheel assembly of claim 10, wherein said gap width is at least 0.08 inch.

12. The trolley wheel assembly of claim 10, wherein the open bearing assembly has an inner race, an outer race, and the single row of bearings is positioned between the inner race and the outer race.

13. The trolley wheel assembly of claim 12, wherein the bearings are the only things in the gap that reduce flow-through area.

14. The trolley wheel assembly of claim 10, wherein the trolley wheel assembly has a ratio of gap width to wheel radius of at least 0.04.

15. The trolley wheel assembly of claim 14, wherein the ratio of gap width to wheel radius is at least 0.06.

16. The trolley wheel of claim 10, wherein the open bearing assembly has a flow-through area, the gap has a total area, and the flow-through area accounts for at least 5% of the total area of the gap, both the flow-through area and the total area of the gap being measured in a plane perpendicular to the wheel's axis.

17. The trolley wheel assembly of claim 16, wherein the flow-through area accounts for at least 7% of the total area of the gap.

18. The trolley wheel assembly of claim 16, wherein the flow-through area accounts for at least 10% of the total area of the gap.

19. The trolley wheel assembly of claim 12, wherein the inner race, outer race, and bearings all comprise metal, the inner race and the bearings having greater hardness than the outer race.

20. The trolley wheel assembly of claim 19, wherein the inner race and the bearings have a Rockwell C scale hardness of 48-60, while the outer race has a Rockwell C scale hardness of 28-32.

21. The trolley wheel assembly of claim 19, wherein the trolley wheel assembly is configured to wear to a condition in which the inner and outer races contact each other, thereby providing an externally visible replacement indicator indicating the bearing assembly has less than 25% of its useful life remaining 22. The trolley wheel assembly of claim 1, wherein the wheel comprises a polymer provided with a filler.

23. The trolley wheel assembly of claim 1, wherein the wheel is coupled to an outer race of the bearing assembly such that the wheel and the outer race rotate together as a single unit during use.

24. The trolley wheel assembly of claim 23, wherein the hub is coupled to an inner race of the bearing assembly to form a hub/inner race subassembly that does not rotate about the wheel's axis during use.

25. The trolley wheel assembly of claim 1, wherein the trolley wheel assembly is on a track of the conveyor system, and at least one poultry item is held on the conveyor system.

26. A trolley assembly for use in a conveyor system, comprising:
a support member for supporting an item being moved by the conveyor system;
first and second trolley brackets coupled to the support member; and
first and second trolley wheel assemblies coupled to the first and the second trolley brackets, respectively, for providing rolling engagement of the trolley assembly with a track of the conveyor system, wherein each trolley wheel assembly includes
a wheel having a central opening,
a hub positioned within the central opening, the hub being coupled to the first or second trolley bracket, and
an open bearing assembly positioned within the central opening between the wheel and the hub, the open bearing assembly providing relative rotational movement between the wheel and the hub,
wherein the wheel comprises a first face, a second face, and a circumferential rolling surface, the first and the second faces each having an inner boundary adjacent to the central opening and an outer edge region adjacent the circumferential rolling surface,
wherein at least one of the first face and the second face has one or more surface features configured to facilitate flow of a fluid toward the open bearing assembly when cleaning the open bearing assembly, the one or more surface features comprising a plurality of channels extending along the wheel face between the outer edge region and the inner boundary of the wheel face, and
wherein the open bearing assembly includes only a single row of bearings between the first face of the wheel and the second face of the wheel.

27. The trolley assembly of claim 26, wherein said one or more surface features further comprise a plurality of ribs extending toward the inner boundary.

28. The trolley assembly of claim 26, wherein said one or more surface features comprise one or more angled surfaces located between the outer edge region of the wheel face and the inner boundary of the wheel face, the angled surface(s) extending axially inward toward the inner boundary of the wheel face.

29. The trolley assembly of claim 26, wherein the open bearing assembly consists essentially of an inner race, an outer race, and a single row of ball bearings positioned between the inner race and the outer race.

30. The trolley assembly of claim 26, wherein the support member holds at least one poultry item.

31. A method of washing a trolley wheel assembly of an overhead conveyor system, comprising spraying fluid toward at least one of a first face and a second face of a wheel of the trolley wheel assembly so as to direct the sprayed fluid into an open bearing assembly of the trolley wheel assembly, thereby flushing the open bearing assembly with sprayed fluid, wherein the open bearing assembly is positioned within an opening between the wheel and a hub of the trolley wheel assembly, the first face and the second face of the wheel each have an inner boundary adjacent to the opening and an outer edge region adjacent a circumferential rolling surface of the wheel, wherein at least one of the first face and the second face has one or more surface features configured to facilitate flow of the sprayed fluid toward the open bearing assembly, the one or more surface features comprising a plurality of channels extending along the wheel face between the outer edge region and the inner boundary of the wheel face, and wherein the open bearing assembly includes only a single row of bearings between the first face of the wheel and the second face of the wheel.

32. The method of claim 31, further comprising, prior to and/or after washing the trolley wheel assembly, conveying at least one poultry item along the overhead conveyor system.

33. The method of claim 31, wherein the wheel face is angled axially inward from the outer edge region of the wheel face toward the inner boundary of the wheel face.

34. The method of claim 31, wherein the first face and the second face of the wheel are each angled axially inward from the outer edge region toward the inner boundary, such that sprayed fluid is directed into the open bearing assembly and fluid that thereby enters the bearing assembly can flow freely downwardly along either face of the wheel.

35. A trolley wheel assembly for use in a conveyor system, the trolley wheel assembly comprising a wheel having a central opening, an outer race positioned within the central opening, an inner race positioned within the outer race, a plurality of bearing members positioned in a single row between the inner race and the outer race, the bearing members providing relative rotational movement between the inner race and the outer race, the inner race and the outer race providing a raceway containing the bearing members, wherein the trolley wheel assembly is configured to wear to a condition in which the inner and outer races contact each other, thereby providing an externally visible replacement indicator indicating the bearing assembly has less than 25% of its useful life remaining, the inner race, outer race, and bearing members all comprising metal, the inner race and the bearing members having greater hardness than the outer race.

36. The trolley wheel assembly of claim 35, wherein the inner race and the bearing members have a Rockwell C scale hardness of 48-60, while the outer race has a Rockwell C scale hardness of 28-32.

37. The trolley wheel assembly of claim 35, wherein the trolley wheel assembly includes directing means for directing a fluid into the raceway for cleaning the raceway and the bearing members.

38. The trolley wheel assembly of claim 35, wherein the outer race, inner race, and bearing members collectively form an open bearing assembly, the open bearing assembly having a flow-through area of at least 0.018 square inch.

39. The trolley wheel assembly of claim 38, wherein the open bearing assembly has a gap into which fluid can be sprayed, the gap having a width of at least 0.07 inch.

40. The trolley wheel assembly of claim 39, wherein the bearing members are the only things in the gap that reduce flow-through area.

41. The trolley wheel assembly of claim 39, wherein the trolley wheel assembly has a ratio of gap width to wheel radius of at least 0.04.

42. The trolley wheel of claim 39, wherein the gap has a total area of which flow-through area accounts for at least 5%, both said areas being measured in a plane perpendicular to the wheel's axis.

43. The trolley wheel assembly of claim 22, wherein the filler is present in an amount between about 5% and 15% by weight.

44. The trolley wheel assembly of claim 43, wherein the filler comprises glass.

45. The trolley wheel assembly of claim 22, wherein the polymer comprises polyacetal, and the filler comprises glass and is present in an amount of about 5% by weight.

46. The trolley wheel of claim 1 wherein the first face and the second face of the wheel are each angled axially inward from the outer edge region toward the inner boundary, such that sprayed fluid is directed into the open bearing assembly and fluid that thereby enters the bearing assembly can flow freely downwardly along either face of the wheel, and wherein each wheel face has a plurality of channels extending along the wheel face between the outer edge region and the inner boundary of the wheel face.

47. The trolley wheel assembly of claim 35, wherein the trolley wheel assembly is provided in combination with the conveyor system, the trolley wheel assembly being mounted on a track of the conveyor system, at least one poultry item being held on the conveyor system.

48. The trolley wheel assembly of claim 35, wherein the wheel comprises a first face, a second face, and a circumferential rolling surface, the first and the second faces each having an inner boundary adjacent to the central opening and an outer edge region adjacent the circumferential rolling surface, the trolley wheel assembly having only a single row of bearings between the first face of the wheel and the second face of the wheel.

* * * * *